US012787951B2

(12) United States Patent
Reinhart

(10) Patent No.: US 12,787,951 B2
(45) Date of Patent: Nov. 10, 2026

(54) WATERING CAN

(71) Applicant: NICKOLAS BRANDS, LLC, Findlay, OH (US)

(72) Inventor: Nickolas Reinhart, Sarasota, FL (US)

(73) Assignee: Agna, LLC, Sarasota, FL (US)

( * ) Notice: Subject to any disclaimer, the term of this patent is extended or adjusted under 35 U.S.C. 154(b) by 648 days.

(21) Appl. No.: 17/877,179

(22) Filed: Jul. 29, 2022

(65) Prior Publication Data

US 2023/0030469 A1 Feb. 2, 2023

Related U.S. Application Data

(60) Provisional application No. 63/226,823, filed on Jul. 29, 2021.

(51) Int. Cl.
*A01G 25/14* (2006.01)

(52) U.S. Cl.
CPC .................................... *A01G 25/14* (2013.01)

(58) Field of Classification Search
CPC ................................ A01G 25/14; B65D 25/42
USPC ........................... 239/377; 16/411, 421, 430; 222/465.1–475.1; 220/755
See application file for complete search history.

(56) References Cited

U.S. PATENT DOCUMENTS 1,680,983 A * 8/1928 Graf ...................... B05B 7/2429 239/375
4,650,100 A * 3/1987 Echazabal, Jr. ........ B65D 25/42 D9/527
5,915,628 A 6/1999 Kreizel
6,302,336 B1 * 10/2001 Brown .................. A01G 25/14 239/394
2010/0163641 A1 * 7/2010 Ugone .................. A01G 25/14 239/377

FOREIGN PATENT DOCUMENTS

GB 845467 A * 8/1960 ............ A01G 25/14

* cited by examiner

*Primary Examiner* — Steven M Cernoch
(74) *Attorney, Agent, or Firm* — Jacob M. Ward; Ward Law Office LLC

(57) ABSTRACT

The watering can device is provided that includes a basin having a sidewall, a bottom wall, and a top wall. The top wall includes an aperture configured to permit water to be passed through the aperture and fill the basin. The watering can device includes a handle having a hand protrusion configured to enhance the grip and the comfortability of the user. The watering can device includes a spout and a watering head that is configured to be coupled to a terminal end of the spout.

17 Claims, 5 Drawing Sheets

WATERING CAN

CROSS-REFERENCE TO RELATED APPLICATIONS

This application claims the benefit of U.S. Provisional Application Ser. No. 63/226,823, filed on Jul. 29, 2021. The entire disclosure of the above application is hereby incorporated herein by reference.

FIELD

The disclosure generally relates to containers and, more particularly, to watering containers.

INTRODUCTION

This section provides background information related to the present disclosure which is not necessarily prior art.

If there is one tool that symbolizes the small backyard or container garden, it is the watering can. Hoses and sprinklers are often used to water plants. However, there is no comparison to the convenience and portability offered by a watering can, especially for the small backyard or indoor garden.

Conventional watering cans can be composed of fairly standard elements including a reservoir with a closed bottom, sidewalls, an open top, a spout, and a handle. Typically, the volume of water contained in a watering can will vary between one-quarter of a gallon, for small house plants, up to five gallons of water for use in a backyard garden. The weight of a water-filled watering can may therefore vary between approximately two and forty pounds.

Weights on the heavier side can often turn the otherwise pleasurable task of watering one's plants into a discomforting and cumbersome chore. For instance, a water-filled watering can may undesirably slip in the hands of a user and/or fatigue the user due to the weight of the water-filled can.

Additionally, conventional watering cans can include a spout that directs water substantially in line with the spout. Such a spout is configuration to create a flow of water with a more directed stream, but which does not effectively water a larger area such as a garden. Thus, the task of watering undesirably requires a longer duration of lifting by the user of the conventional water-filled watering can.

There is a continuing need for an improved watering can that may provide means for enhancing the grip of a user, and which permits the flow of water to extend over a larger or spread. Desirably, the watering can also facilitate an easier re-filling with water.

SUMMARY

In concordance with the instant disclosure, a watering can device and method that is configured to be more ergonomically handled and also capable of providing an enhanced spread of water flow, and which can also facilitate an easier re-filling with water, has been surprisingly discovered.

A watering can device is provided that includes a basin, a handle, a spout, and a watering head. The basin may include a sidewall, a bottom wall, and a top wall. The handle may be a handle configured to desirably provide better grippage and enhance the structural integrity of the handle. The handle may have a hand protrusion that is configured to fit within a hand of a user. The basin may further include a spout having a first end and a second end. The first end may be coupled to the sidewall of the basin. The second end may include a watering head. The watering head may be a watering head.

A kit for a watering can device is provided that includes a basin having a sidewall, a bottom wall, a top wall, a spout, and a handle coupled to the basin. The handle may have a hand protrusion configured to fit a hand of a user. The kit may also include a watering head that is configured to be coupled to the spout.

Various ways of assembling the watering can device are provided. Certain methods may include a step of providing a basin having a sidewall, a bottom wall, a top wall, a spout, and a handle coupled to the basin. Next, the method may include providing a watering head. Then, the method may include coupling the watering head to the basin.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
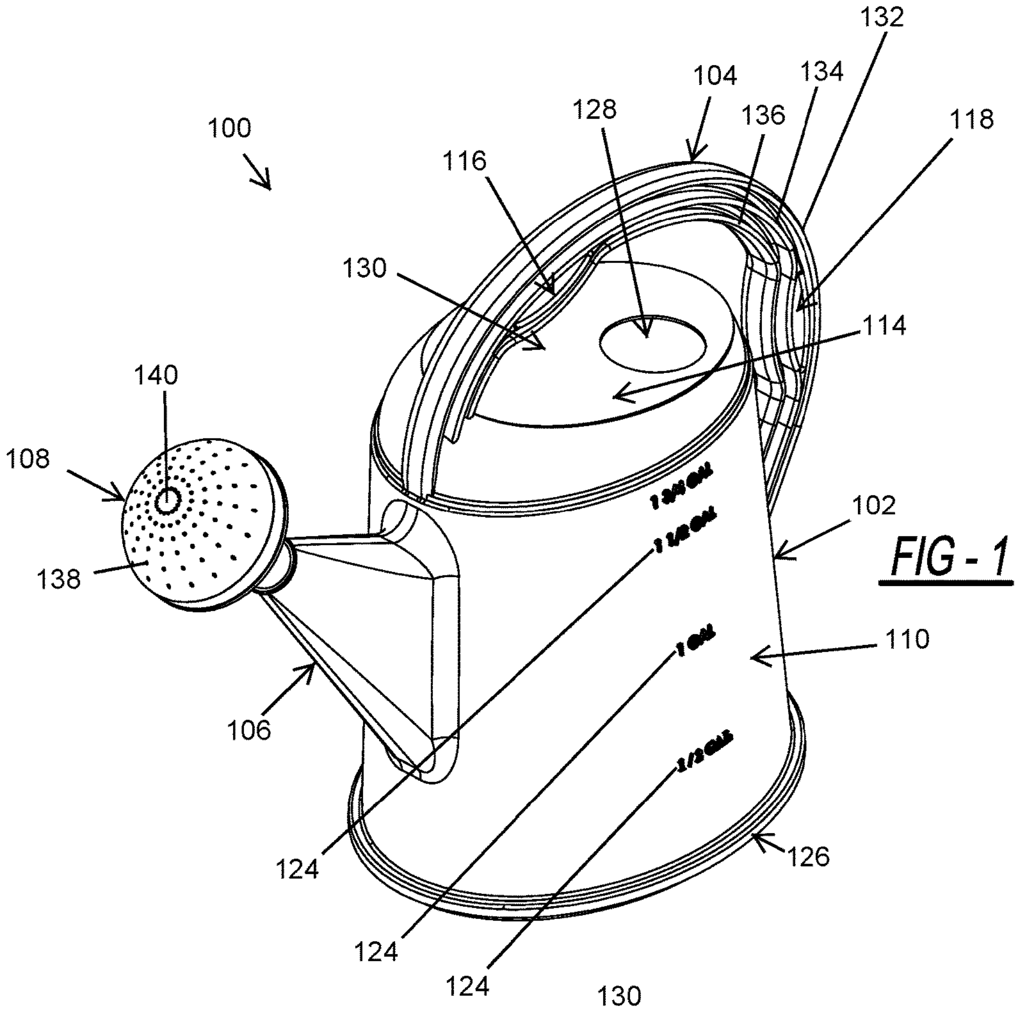
FIG. 1 is a front perspective view of a watering can device, according to one embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. “A” and “an” as used herein indicate “at least one” of the item is present; a plurality of such items may be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
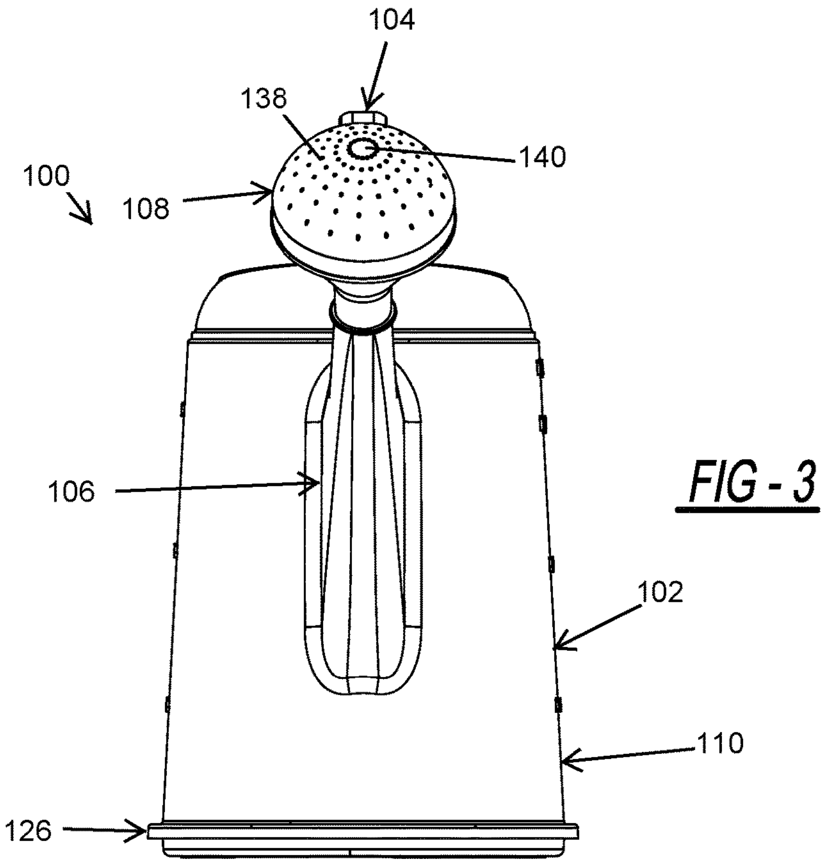
FIG. 3 is a front elevational view of the watering can device, as shown in FIGS. 1-2.
Figure 4:
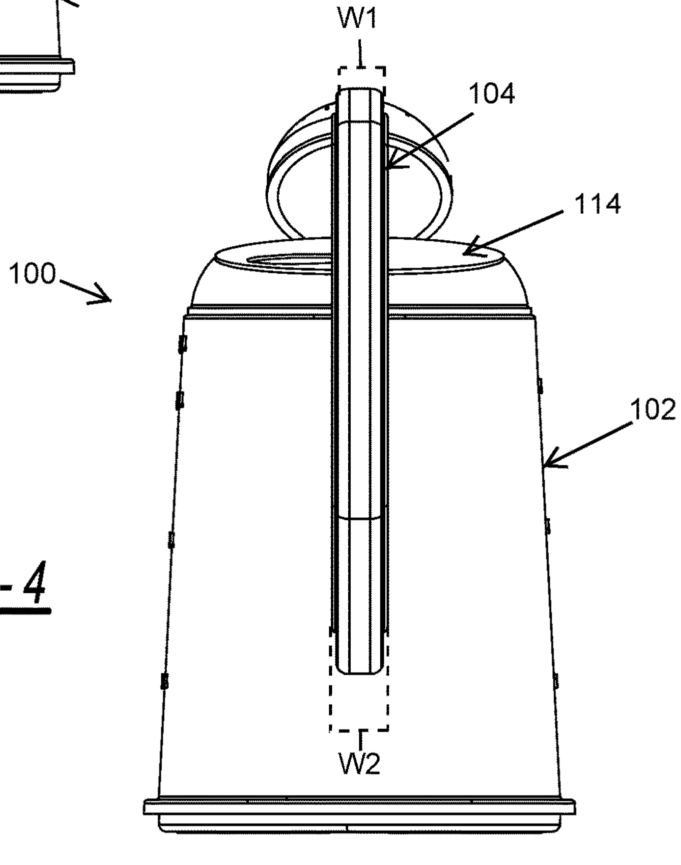
FIG. 4 is a rear elevational view of the watering can device, as shown in FIGS. 1-3.
Figure 5:
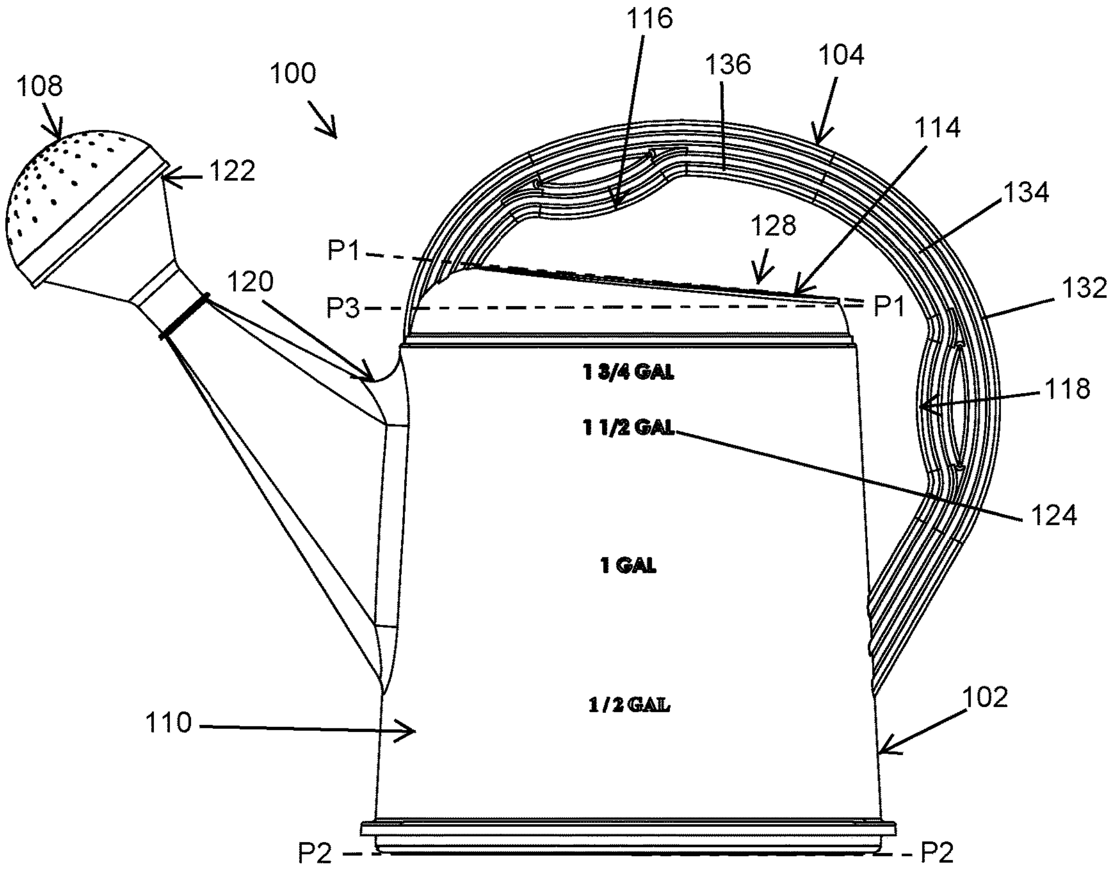
FIG. 5 is a side elevational view of the watering can device, as shown in FIGS. 1-4.
Figure 6:
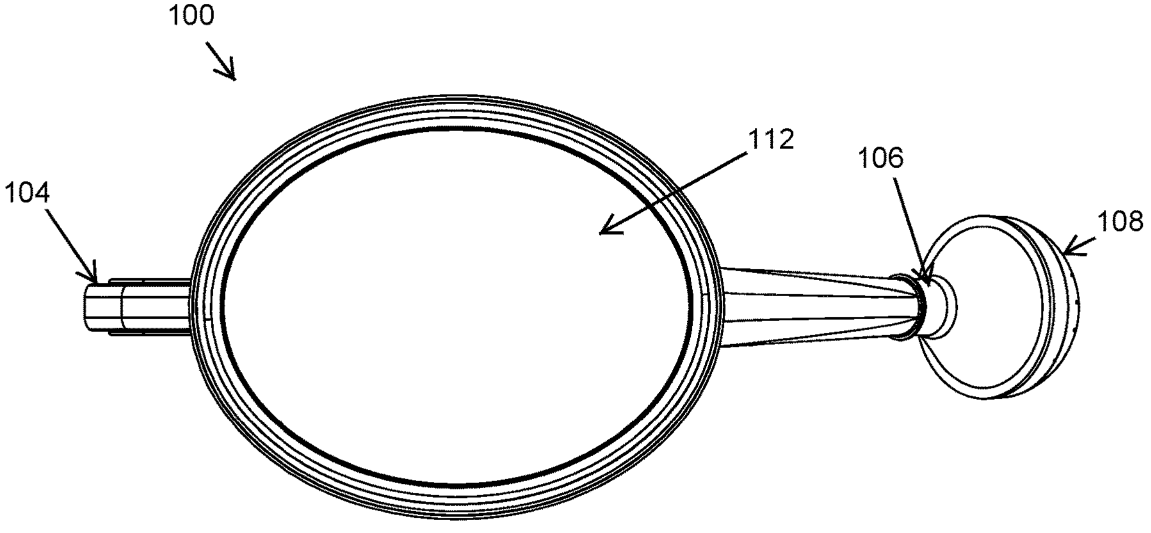
FIG. 6 is a bottom plan view of the watering can device, as shown in FIGS. 1-5.

As shown in FIGS. 1-6, a watering can device 100 includes a basin 102, a handle 104, a spout 106, and a watering head 108. The basin 102 may have a sidewall 110, a bottom wall 112, and a top wall 114. The handle 104 may be configured to desirably provide better graspability and enhance the structural integrity of the handle 104. For example, the handle 104 may be ribbed, as shown in FIG. 5. The handle 104 may also have one or more hand protrusions 116, 118, as also shown in FIG. 5, which are configured to be ergonomically gripped by a user. The hand protrusions 116, 118 can include a first hand protrusion 116 and a second hand protrusion 118.

The spout 106 may have a first end 120 and a second end 122. The first end 120 may be coupled to the sidewall 110 of the basin 102. The second end 122 may be coupled to the watering head 108. The watering head 108 may be hemispherically shaped, as a non-limiting example. Other suitable shapes for the watering head 108 may also be employed within the scope of the present disclosure.

The basin 102 may further include certain features, for example, as shown in FIGS. 1 and 5. The sidewall 110 of the basin 102 may include indication marks 124 configured to provide a reference as to how much of a liquid (not shown) such as water is retained in the basin 102. For example, the indication marks 124 may indicate a scale of units of volume, such as gallons. Other suitable types of the indication marks 124 may also be employed, as desired.

Figure 2:
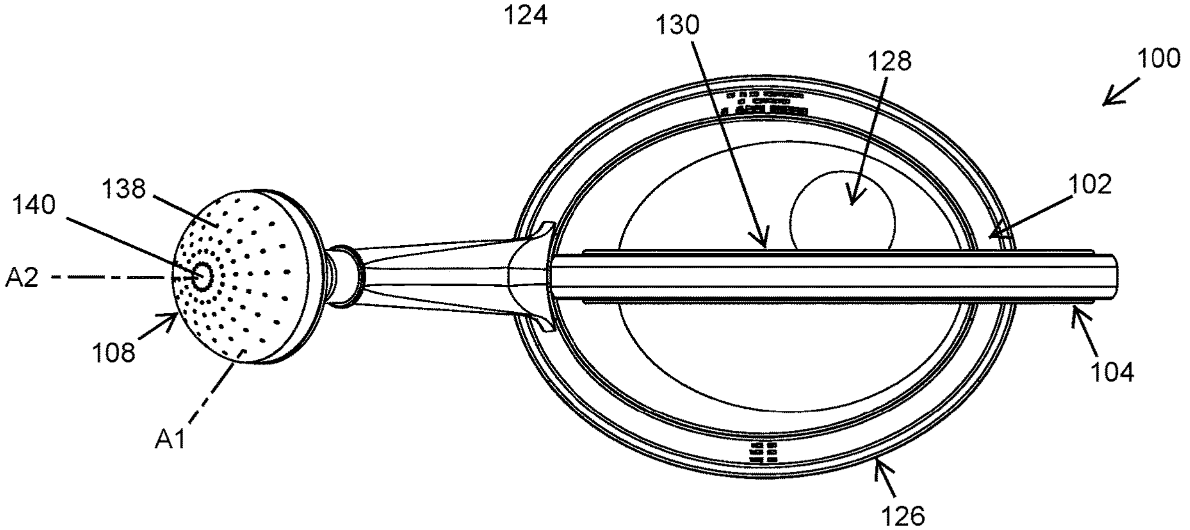
FIG. 2 is a top plan view of the watering can device, as shown in FIG. 1.

As shown in FIGS. 1-3, the bottom wall 112 of the basin 102 may include a lip 126. Advantageously, the lip 126 of the bottom wall 112 may enhance the stability of the watering can device 100 and militate against an undesirable dripping of the liquid, which may otherwise run down the sidewall 110 of the basin 102. It should be appreciated that the bottom wall 112 may be either co-molded with the basin 102 or separately formed and then attached to the basin 102. As a non-limiting example, the bottom wall 112 where separately formed may be attached by sonic welding or adhesive to the basin 102.

In further examples, the top wall 114 of the basin 102 may include an aperture 128 configured to permit the liquid to be passed through the aperture 128 and fill the basin 102. As shown in FIG. 2, the aperture 128 may be offset from a center area 130 of the top wall 114. For example, a major portion or an entirety of the aperture 128 may be offset from the axis A2 along with the handle 104 is oriented.

As shown in FIG. 5, the top wall 114 of the basin 102 may also be disposed on a first plane P1. The bottom wall 112 of the basin 102 may be disposed on a second plane P2. The first plane P1 may be nonparallel with, or transverse to, the second plane P2. Likewise, the first plane P1 may be nonparallel with, or transverse to, a third plane P3 that is disposed adjacent the aperture 128 and parallel with the second plane P2.

Advantageously, the location of the aperture 128 on the top wall 114 and the transverse first plane P1 may permit the watering can device 100 to be tilted while militating against unintentionally allowing the liquid to escape from the aperture 128 in the top wall 114, in use. It should further be appreciated that the combination of the offset location of the aperture 128 and the top wall 114 being on the first plane P1 transverse with the third plane P3, which together define a top wall angle of the top wall 114 therebetween, in conjunction with the unique configuration of the handle 104 (described herein below) permits for an easier refilling of the basin 102 by the user with the liquid in operation. The top wall angle may be between about five degrees and about forty-five degrees, more particularly between about fifteen degrees and about thirty-five degrees, and most particularly about twenty-five degrees. One of ordinary skill in the art may select other suitable angels for the top wall angle within the scope of the present disclosure.

As shown in FIGS. 1 and 5, the handle 104 of the present disclosure may include an exterior rib 132, a middle rib 134, and an interior rib 136. As shown in FIG. 4, each of the exterior rib 132 and the interior rib 136 may have a first width W1. The middle rib 134 may have a second width W2. In a specific example, the second width W2 may be greater than the first width W1. Without being bound to any particular theory, it is believed a hand of a user may more comfortably grip the handle 104 where the second width W2 is greater than the first width W1. As described herein above, the combination of this particular confirmation for the handle 104 together with the orientation of the aperture 128 on the plane P1 is believed to facilitate a refilling of the basin 102.

It should be appreciated that the middle rib 134 may be split into a pair of ribs at the hand protrusion 116, 118, for example, as shown in FIG. 5, which are spaced apart from the angled top wall 114. The pair of ribs at the hand protrusion 116, 118 are further spaced apart both laterally and longitudinally (as shown in FIG. 5) from the aperture 128. The aperture 128 may further be offset to one side of the handle 104 (as shown in FIG. 2) so that a major portion of the aperture 128 is not directly beneath the handle 104. In other words, both the handle 104 and the associated hand protrusion 116, 118 are not disposed immediately above the aperture 128, where they might otherwise interfere with the refilling of the basin 102 through the aperture 128. The pair of ribs at the hand protrusion 116, 118 may be substantially ellipse-shaped, for example. The interior rib 136 may also conform around the ellipse-shaped middle rib 134 at the hand protrusion 116, 118. Other suitable configurations for the had protrusion 116, 118 may also be employed, as desired.

In certain embodiments, as also shown in FIG. 5, the one or more hand protrusions 116, 118 may include the first hand protrusion 116 and the second hand protrusion 118. The first hand protrusion 116 may be disposed on the handle 104 adjacent the top wall 114 of basin 102. The second hand protrusion 118 may be disposed on the handle 104 adjacent the sidewall 110 of the basin 102. It should be understood that the first hand protrusion 116 and the second hand protrusion 118 may be located on the handle 104 in a manner configured to provide enhanced graspability to the user when using the watering can device 100.

In certain embodiments, the watering head 108 may be removably coupled to the second end 122 of the spout 106 in at least one of various ways, including through the use of threads, a fastener, a protrusion, and a friction fit design. The attachment of the watering head 108 with the second end 122 of the spout 102 may be a permanent attachment or a removable attachment, as desired. Advantageously, where the watering head 108 is removably coupled to the second end 122, the watering can device 100 may be more efficiently and adequately cleaned. Other suitable means for attaching the watering head 108 to the second end 122 of the spout 106 may also be employed within the scope of the present disclosure.

The watering head 108 may include an array of substantially circular holes 138 expanding from a center point 140 on the watering head 108. Without being bound to any particular theory, it is believed the hemispherical shape of the watering head 108 in conjunction with the array of substantially circular holes 138 may permit an enhanced range and/or spread of water flow in operation. For instance, in operation, the watering can device 100 may be tilted at an angle configured to maximize the flow of the liquid (not shown) through the watering head 108.

In a particular example, as shown in FIG. 2, due to the watering head 108 the liquid flowing through the outermost circular holes 138 of the array may be directed along a first axis A1. The first axis A1 may be oriented substantially transverse to a second axis A2, which is in turn defined by an orientation of the handle and/or the spout 106, which as shown in FIG. 2 are both oriented along the second axis A2. Advantageously, where the first axis A1 is disposed substantially transverse to the second axis A2, the flow of the liquid through the watering head 108 may have an enhanced range and/or spread. It should be appreciated that the enhanced range and/or spread may desirably allow the user to water a large area, such as a garden, more efficiently.

Figure 7:
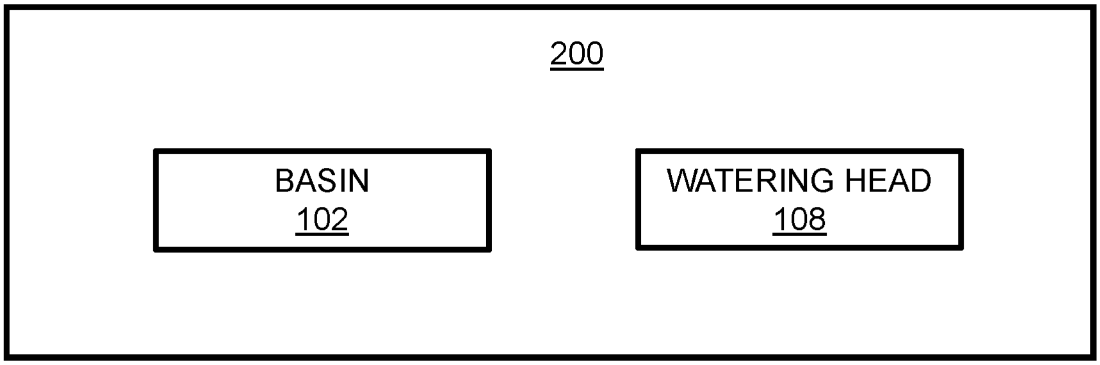
FIG. 7 is a box diagram showing a kit for the watering can device, according to one embodiment of the present disclosure.

As shown in FIG. 7, a kit 200 for a watering can device 100 is provided that includes the basin 102 having the sidewall 110, a bottom wall 112, a top wall 114, a spout 106, and a handle 104 coupled to the basin 102. The handle 104 may have a hand protrusion 116, 118 configured to fit a hand of a user. The kit 200 may also include a watering head 108 which is configured to be coupled to the second end 122 of the spout 106.

Figure 8:
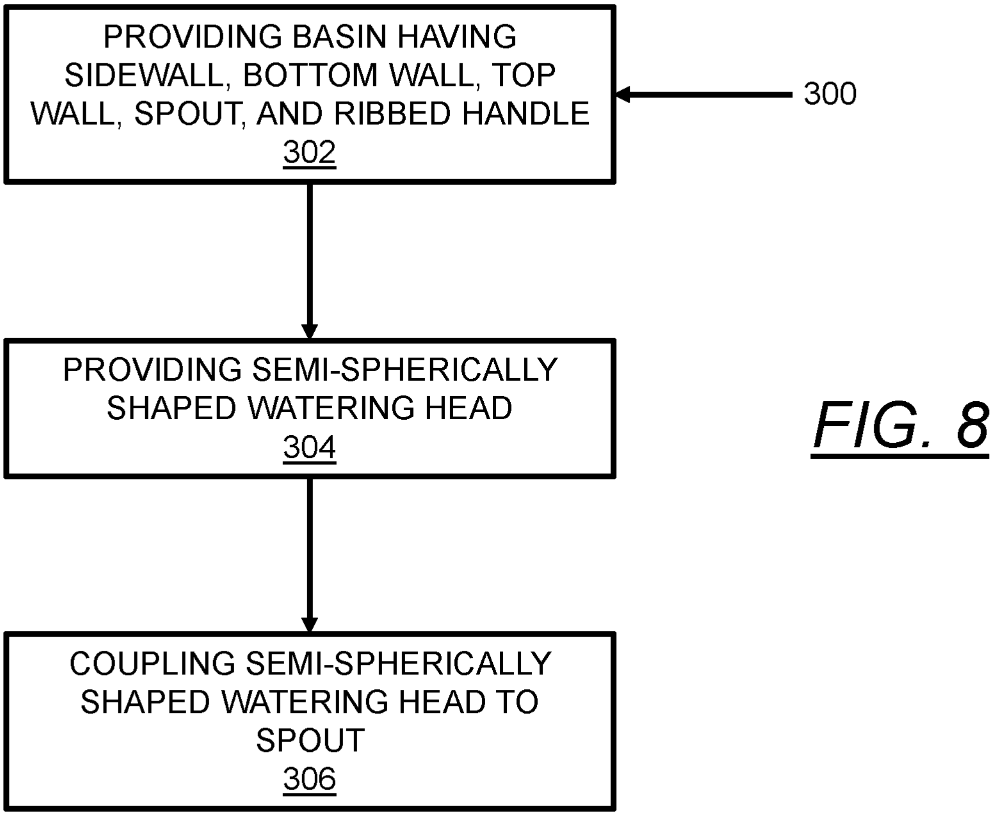
FIG. 8 is a flowchart for a method for assembling the watering can device, according to one embodiment of the present disclosure.

Various ways of assembling the watering can device 100 are also provided. As shown in FIG. 8, one particular method 300 may include a step 302 of providing the basin 102 having the sidewall 110, the bottom wall 112, the top wall 114, the spout 106, and the handle 104 coupled to the basin 102. Next, the method 300 may include a step 304 of providing the watering head 108. Then, the method 300 may include a step 306 of coupling the watering head 108 to the second end 122 of the spout 106. Other steps associated with the method 300 and consistent with the present disclosure as set forth herein may also be employed, as desired.

Advantageously, the watering can device 100 may be more ergonomically handled and may also be configured to provide an enhanced spread of water flow.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A watering can device, comprising:

a basin having a sidewall, a bottom wall, and a top wall with an aperture configured to permit a liquid to be passed through the aperture and fill the basin;

a handle having at least one hand protrusion, a first end of the handle attached to the top wall of the basin and a second end of the handle attached to the sidewall of the basin, the aperture positioned between the first end and the second end of the handle, the handle includes an exterior rib, a middle rib, and an interior rib, the exterior rib and the interior rib each having a first width, the middle rib having a second width, and the second width being greater than the first width;

a spout having a first end and a second end, the first end attached to the basin; and a watering head coupled to the second end of the spout, wherein:

the aperture is offset from a longitudinal axis running through each of the watering head, the spout, and the handle, the top wall of the basin is disposed on a first plane, and the bottom wall of the basin is disposed on a second plane, a third plane disposed at a lowest point of the top wall, the third plane parallel to the second plane, and the first plane extends at an angle relative to the third plane along the longitudinal axis such that, moving along the longitudinal axis from the handle toward the watering head, a perpendicular distance between the first plane and the third plane increases, thereby forming a top wall angle;

wherein the top wall is disposed entirely on the first plane.

2. The watering can device of claim 1, wherein the sidewall tapers such that a cross-sectional dimension of the basin decreases from the bottom wall toward the top wall.

3. The watering can device of claim 1, wherein the second end of the handle is attached to the sidewall of the basin at a height above the bottom wall.

4. The watering can device of claim 1, wherein the handle includes a first hand protrusion and a second hand protrusion, each of the first hand protrusion and the second hand protrusion having an arcuate shape.

5. The watering can device of claim 4, wherein the arcuate shape of each of the first hand protrusion and the second hand protrusion increases a thickness of the handle at each of the first hand protrusion and the second hand protrusion relative to a thickness of the handle between the first hand protrusion and the second hand protrusion.

6. The watering can device of claim 5, wherein the first hand protrusion is disposed on the handle adjacent the top wall of the basin and the second hand protrusion is disposed on the handle adjacent the sidewall of the basin.

7. The watering can device of claim 6, wherein the first hand protrusion is disposed on the handle above the third plane and the second hand protrusion is disposed on the handle below the third plane.

8. The watering can device of claim 1, wherein the interior rib is disposed adjacent the basin, the middle rib is disposed on the interior rib, and the exterior rib is disposed on the middle rib.

9. The watering can device of claim 1, wherein the first hand protrusion and the second hand protrusion are each formed by the middle rib and the interior rib, the middle rib and the interior rib each having an arcuate shape that curves toward the basin.

10. The watering can device of claim 1, wherein the first end of the spout is attached to the sidewall of the basin below the third plane.

11. The watering can device of claim 1, wherein the bottom wall includes a lip.

12. The watering can device of claim 11, wherein the lip extends outward from the sidewall of the basin.

13. The watering can device of claim 12, wherein the lip is configured to enhance stability of the watering can device and militate against dripping of the liquid down the sidewall of the basin.

14. The watering can device of claim 1, wherein the aperture is offset to one side of the handle such that a major portion of the aperture is not beneath the handle.

15. The watering can device of claim 1, wherein the second end of the spout is disposed above the third plane.

16. The watering can device of claim 1, wherein the aperture is offset from a lateral axis of the basin in a direction toward the second end of the handle.

17. A watering can device, comprising:

a basin having a sidewall, a bottom wall, and a top wall with an aperture configured to permit a liquid to be passed through the aperture and fill the basin, the basin having an oval cross-sectional shape, the sidewall tapering such that a cross-sectional dimension of the basin decreases from the bottom wall toward the top wall, the bottom wall including a lip extending outward from the bottom wall, and the sidewall including indication marks configured to provide a reference as to a volume of liquid retained in the basin;

a handle having a first hand protrusion and a second hand protrusion, each of the first hand protrusion and the second hand protrusion having an arcuate shape, the handle including an exterior rib, a middle rib, and an interior rib, the interior rib disposed adjacent the basin, the middle rib disposed on the interior rib, and the exterior rib disposed on the middle rib, the exterior rib and the interior rib each having a first width, the middle rib having a second width greater than the first width, the first hand protrusion and the second hand protrusion each formed by the middle rib and the interior rib, the middle rib and the interior rib each having the arcuate shape that curves toward the basin, a first end of the handle attached to the top wall of the basin and a second end of the handle attached to the sidewall of the basin at a height above the bottom wall, the first hand protrusion disposed above a third plane and the second hand protrusion disposed below the third plane;

a spout having a first end and a second end, the first end attached to the sidewall of the basin below the third plane and the second end disposed above the third plane; and a watering head removably coupled to the second end of the spout, the watering head including an array of substantially circular holes expanding from a center point on the watering head, wherein:

the aperture is offset from a longitudinal axis of the basin, and offset from a lateral axis of the basin in a direction toward the second end of the handle, such that a major portion of the aperture is not directly beneath the handle, the top wall of the basin is disposed on a first plane and the bottom wall of the basin is disposed on a second plane, the third plane is disposed at a lowest point of the top wall, the third plane parallel to the second plane, the first plane extends at an angle relative to the third plane along the longitudinal axis such that, moving along the longitudinal axis from the handle toward the watering head, a perpendicular distance between the first plane and the third plane increases, thereby forming a top wall angle, and wherein the top wall is disposed entirely on the first plane.

* * * * *